J. BERGE.
SPEEDOMETER.
APPLICATION FILED APR. 14, 1919.
1,324,788.
Patented Dec. 16, 1919.
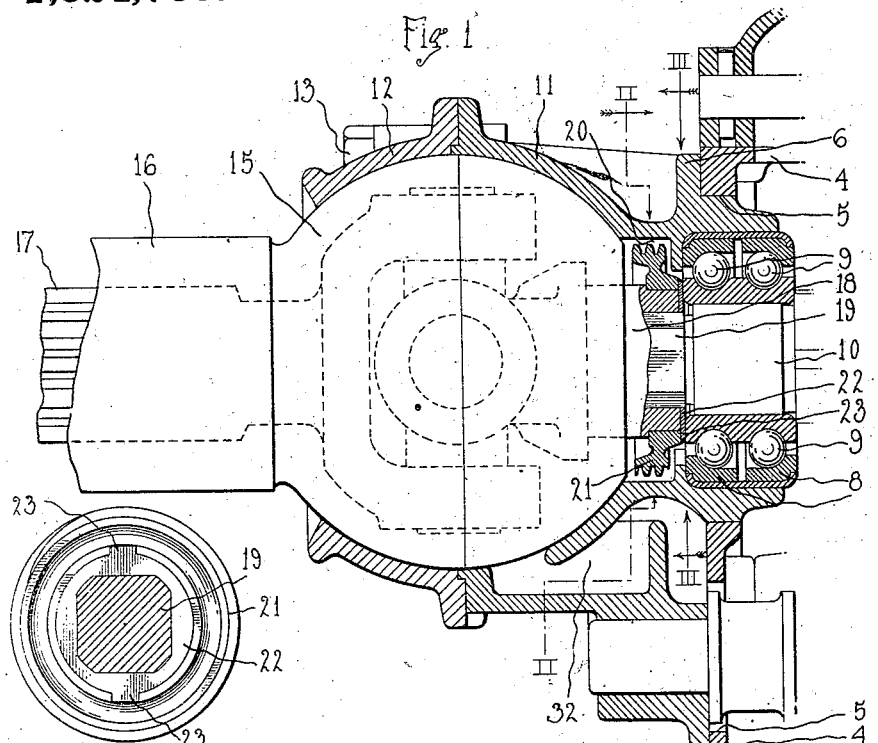
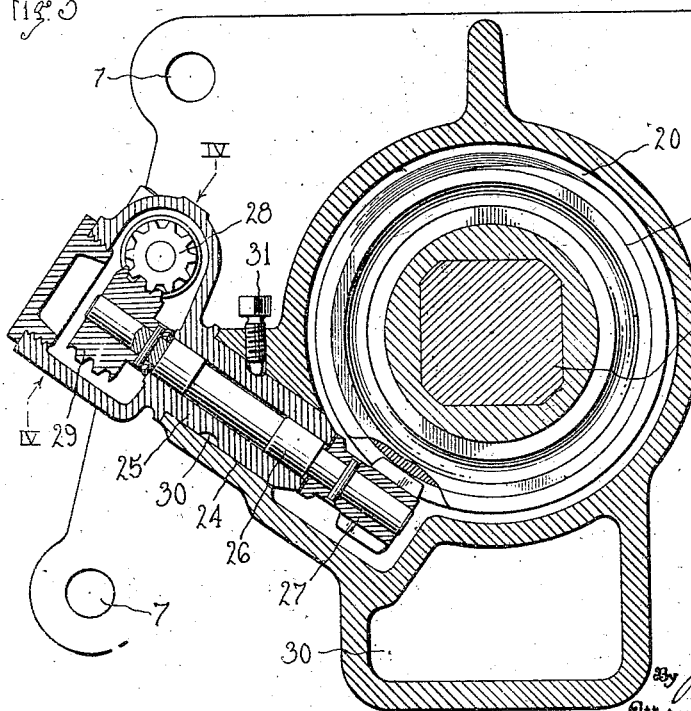
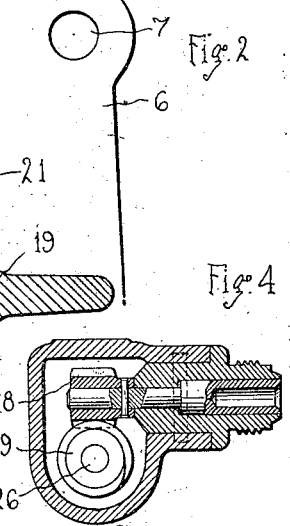
Inventor
Joseph Berge

UNITED STATES PATENT OFFICE.

JOSEPH BERGE, OF FLINT, MICHIGAN, ASSIGNOR TO CHAMPION IGNITION COMPANY, OF FLINT, MICHIGAN, A CORPORATION OF MICHIGAN.

SPEEDOMETER.

1,324,788. Specification of Letters Patent. Patented Dec. 16, 1919.

Application filed April 14, 1919. Serial No. 289,828.

*To all whom it may concern:*

Be it known that I, JOSEPH BERGE, a citizen of the United States, and resident of Flint, Genesee county, State of Michigan, have invented certain new and useful Improvements in Speedometers, of which the following is a specification.

My invention relates to transmission gearing for use in connection with automobiles and similar self-propelled vehicles, and particularly to driving means provided in connection with such transmission gearing for operating a speedometer, odometer or similar instrument.

The object of my invention is to provide, in combination with transmission gearing for use in connection with a motor vehicle, means for operating a speedometer or odometer; the driving means thus provided for the speedometer or odometer being so arranged that the driving and driven members thereof are maintained in proper position relative to one another, and to the driving shaft whereby they are operated, in a better and more fixed and permanent manner than has heretofore ordinarily been the case.

My invention is illustrated in its preferred embodiment in the drawing forming part of this specification, although it will be appreciated that the same includes such variations and modifications of the particular form thereof illustrated as are obvious to those skilled in the art to which my invention relates, and such as come within the scope of the concluding claims.

In the accompanying drawing:

Figure 1 is a fragmentary view showing my invention as applied to an ordinary type of transmission gearing;

Fig. 2 is a view showing a section taken upon a plane indicated by the line II—II of Fig. 1, looking toward the right;

Fig. 3 is a view showing a section taken upon a plane indicated by the line III—III, Fig. 1, looking toward the left, this view showing the driving gear whereby the speedometer or similar instrument is operated; and, Fig. 4 is a view showing a section on planes indicated by the broken line IV—IV, Fig. 3.

Referring to the drawing, the reference numeral 4 designates the end portion of the casing provided for the transmission gearing ordinarily present in self-propelled vehicles and within which the various gears concerned with the driving of the vehicle at various speeds, and commonly with the reverse thereof, are located and held in proper relation with one another. These gears, however, are not illustrated herein as my present invention is in no way concerned with features of gear construction or arrangement.

The end of the gear casing or housing 4 is commonly provided with an opening 5, and the reference numeral 6 designates a cover or head for closing the said opening; the same being secured to the gear housing in any way, as by means of bolts or cap screws passing through the openings 7. The head 6 is provided with a bearing seat within which races 8 for ball bearings 9 are provided, whereby a bearing is provided for the left hand end of a rotatable driving shaft 10 driven by the gears within the gear casing, and from which shaft motion is communicated to the rear driven axle of the vehicle. It will be appreciated, however, that while the head referred to provides a support for the bearing for the driven shaft in question, the said bearing may be of any appropriate form and is not limited to the particular type of bearing referred to herein.

The head 6 also carries a casing made up of two sections 11—12 secured together by bolts 13, and the general form of which casing is spherical; and within which casing the spherical end 15 of a torque tube 16 is secured, the form of the casing and head thus providing for the adjustment of the torque tube into such angular position as may be necessary because of the relative locations of the transmission gearing housing and of the rear axle of the vehicle.

Motion is communicated from the driving shaft 10 to a driven shaft 17 extending along the torque tube 16 and to the rear axle of the vehicle for driving the same, commonly through suitable differential gearing, through a universal joint or connection located within the spherical head 15 of the torque tube 16 and which universal joint is indicated in dotted lines in Fig. 1, this method of driving being necessary because of the angular position which the torque tube ordinarily assumes; and the reference numeral 18 designates a driven member, which is in fact one of the members of the universal joint referred to, to which member motion is communicated from the driving shaft 10 through a squared projection 19 at the end of the said shaft extending into a correspondingly shaped opening provided in said driven member.

Formed in the interior of the element provided by the casing section 11 and the head 6 is a circular recess indicated by the reference numeral 20, said recess being located between the spherical casing made up of the sections 11—12 and the bearing 8 for the driving shaft 10; and within this recess is located a spiral gear 21, said gear being carried by the end of the driven member 18 of the universal joint, and driven in any way but preferably by means of a driving key or washer 22 having a squared opening through which the end 19 of the shaft 10 extends, and lugs 23 fitting into recesses in the said gear, as best shown in Fig. 3, to thereby provide a positive driving connection through which the spiral gear 21 is operated.

Extending tangentially to the circular recess 20 is a passage 24, this passage and its arrangement relative to the circular recess being best shown in Fig. 2 of the drawing. Located within the passage in question is a sleeve 25 which is provided with bearings for a driving shaft 26, the inner end of said shaft being provided with a pinion 27 which is in mesh with the spiral gear 21, and whereby motion is communicated to the shaft from the said gear. This shaft 26 is employed to drive the odometer, speedometer or other instrument to be operated; the driving being ordinarily accomplished through and by means of a suitable flexible shaft extending from the said shaft to the instrument to be driven, suitable right angle gearing 28, 29 being preferably provided in order that the flexible shaft may be more conveniently connected with the said driving shaft.

The sleeve 25 whereby the shaft 26 is carried is shown as provided with a groove 30, and 31 designates a set-screw whereby the sleeve may be securely held in place within the passage in which it is located; the set-screw being arranged at an angle to the plane of the groove so that the inner end thereof which enters the groove will tend to force the sleeve 25 inward or downward and to the right, in Fig. 2, as will be appreciated.

The reference numeral 32 designates an oil well for lubricating the various parts of the universal joint above referred to. This lubricating feature, however, is not involved in the present application and need not be referred to in detail.

Having thus described and explained my invention, I claim and desire to secure by Letters Patent:

1. In transmission gearing of the class described, a casing having an opening therein; a head for closing said opening and which head is provided with a bearing for supporting the end of a rotatable driving shaft; a second casing carried by said head; an internal circular recess located between said bearing and said spherical casing; a driven member to which motion is communicated from said driving shaft; a gear located within said circular recess and which gear is driven from said driving shaft; a passage extending tangential to said circular recess; a sleeve secured in place within said passage; a shaft carried by and rotatable in bearings provided by said sleeve; and a pinion carried by said shaft, and which pinion is in mesh with said gear.

2. In transmission gearing of the class described, a gear casing having an opening therein; a head for closing said opening and which head is provided with a bearing for supporting the end of a rotatable driving shaft; a casing carried by said head; an internal circular recess located between said bearing and said spherical casing; a driven member to which motion is communicated from said driving shaft; a gear carried by and rotatable with said driven member and located within said circular recess; a passage extending tangential to said circular recess; a sleeve secured in place within said passage; a shaft carried by and rotatable in bearings carried by said sleeve; and a pinion carried by said shaft, and which pinion is in mesh with said gear.

3. In transmission gearing of the class described, a gear casing having an opening therein; a head for closing said opening and which head is provided with a bearing for supporting the end of a rotatable driving shaft; a spherical casing carried by said head; an internal circular recess located between said bearing and said spherical casing; a driven member to which motion is communicated from said driving shaft; a gear carried by and rotatable with said driven member and located within said circular recess; a passage extending tangential to said circular recess; a sleeve located within said passage and having an exterior groove; a set-screw arranged at an angle to the axis of said sleeve and extending through the wall of said passage, and the inner end of which is adapted to enter said groove to thereby hold said sleeve in place; a shaft carried by and rotatable in bearings formed within said sleeve; and a pinion secured to the inner end of said shaft, and which pinion is in mesh with the said gear.

In testimony whereof I affix my signature.

JOSEPH BERGE.